United States Patent
Son et al.

(10) Patent No.: US 11,706,482 B2
(45) Date of Patent: Jul. 18, 2023

(54) DISPLAY DEVICE

(71) Applicant: LG ELECTRONICS INC., Seoul (KR)

(72) Inventors: Chulmin Son, Seoul (KR); Seunghyun Heo, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 264 days.

(21) Appl. No.: 16/971,470

(22) PCT Filed: Feb. 20, 2018

(86) PCT No.: PCT/KR2018/002070
§ 371 (c)(1),
(2) Date: Aug. 20, 2020

(87) PCT Pub. No.: WO2019/164020
PCT Pub. Date: Aug. 29, 2019

(65) Prior Publication Data
US 2020/0404362 A1  Dec. 24, 2020

(51) Int. Cl.
*H04N 5/445* (2011.01)
*H04N 21/439* (2011.01)
(Continued)

(52) U.S. Cl.
CPC ......... *H04N 21/4394* (2013.01); *G06F 3/167* (2013.01); *G06F 16/48* (2019.01);
(Continued)

(58) Field of Classification Search
CPC ......... H04N 21/4394; H04N 21/42203; H04N 21/42204; H04N 21/4782; H04N 21/4828;
(Continued)

(56) References Cited

U.S. PATENT DOCUMENTS 7,672,931 B2   3/2010  Hurst-Hiller et al.
9,251,786 B2   2/2016  Cho et al.
(Continued)

FOREIGN PATENT DOCUMENTS

JP   2001350682   12/2001
KR   20020013148   2/2002
(Continued)

OTHER PUBLICATIONS

PCT International Application No. PCT/KR2018/002070, International Search Report dated Nov. 19, 2018, 3 pages.

*Primary Examiner* — Annan Q Shang
(74) *Attorney, Agent, or Firm* — Lee Hong Degerman Kang & Waimey

(57) ABSTRACT

Provided is a display device including a display unit, a storage unit configured to store information on a web page, a microphone configured to receive a user's voice command, a network interface unit configured to perform communication with a natural language processing (NLP) server, and a controller configured to transmit text data of the voice command to the NLP server, to receive intention analysis result information corresponding to the voice command from the NLP server, to select, as a final candidate address, one of a plurality of candidate addresses related to a search word included in the received intention analysis result information if the search word is not stored in the storage unit, and to access a website corresponding to the selected final candidate address.

14 Claims, 13 Drawing Sheets

(51) Int. Cl.
| | |
|---|---|
| *G06F 16/955* | (2019.01) |
| *G06F 16/9535* | (2019.01) |
| *G06F 16/9538* | (2019.01) |
| *G06F 16/48* | (2019.01) |
| *G06F 3/16* | (2006.01) |
| *G10L 15/18* | (2013.01) |
| *G10L 15/22* | (2006.01) |
| *G10L 15/30* | (2013.01) |
| *H04N 21/422* | (2011.01) |
| *H04N 21/4782* | (2011.01) |
| *H04N 21/482* | (2011.01) |
| *H04N 21/643* | (2011.01) |

(52) U.S. Cl.
CPC ...... *G06F 16/9535* (2019.01); *G06F 16/9538* (2019.01); *G06F 16/9558* (2019.01); *G10L 15/1815* (2013.01); *G10L 15/22* (2013.01); *G10L 15/30* (2013.01); *H04N 21/42203* (2013.01); *H04N 21/42204* (2013.01); *H04N 21/4782* (2013.01); *H04N 21/4828* (2013.01); *H04N 21/64322* (2013.01); *G10L 2015/223* (2013.01)

(58) Field of Classification Search
CPC ......... H04N 21/64322; H04N 21/8405; H04N 21/654; H04N 21/658; G06F 3/167; G06F 16/48; G06F 16/9535; G06F 16/9538; G06F 16/9558; G10L 15/1815; G10L 15/22; G10L 15/30; G10L 2015/223; G10L 15/26
See application file for complete search history.

(56) References Cited

U.S. PATENT DOCUMENTS

| | | | |
|---|---|---|---|
| 9,583,100 B2 * | 2/2017 | Burke | G10L 15/22 |
| 2002/0004721 A1 | 1/2002 | Cha et al. | |
| 2011/0035224 A1 * | 2/2011 | Sipe | G06F 18/00 |
| | | | 704/E15.001 |
| 2011/0161081 A1 * | 6/2011 | Ballinger | G06F 40/284 |
| | | | 704/245 |
| 2013/0166290 A1 * | 6/2013 | Suzuki | G10L 15/22 |
| | | | 704/231 |
| 2014/0007392 A1 * | 1/2014 | Kajiwara | A43C 1/003 |
| | | | 24/715.3 |
| 2023/0055223 A1 * | 2/2023 | Mixter | H04L 12/2825 |
| 2023/0055576 A1 * | 2/2023 | Zhang | H04M 1/7243 |

FOREIGN PATENT DOCUMENTS

| | | |
|---|---|---|
| KR | 20070067651 | 6/2007 |
| KR | 20080031696 | 4/2008 |
| KR | 20090020921 | 2/2009 |
| KR | 20100006495 | 1/2010 |

* cited by examiner

FIG. 13

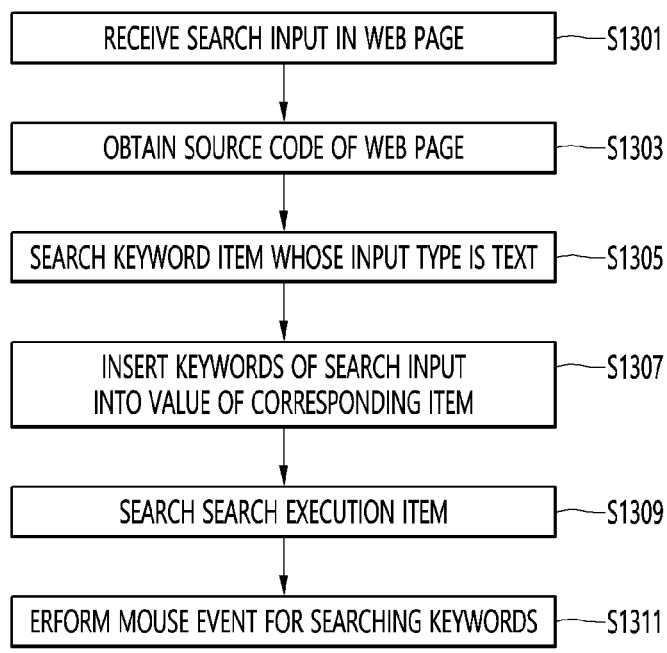

RECEIVE SEARCH INPUT IN WEB PAGE —S1301

OBTAIN SOURCE CODE OF WEB PAGE —S1303

SEARCH KEYWORD ITEM WHOSE INPUT TYPE IS TEXT —S1305

INSERT KEYWORDS OF SEARCH INPUT INTO VALUE OF CORRESPONDING ITEM —S1307

SEARCH SEARCH EXECUTION ITEM —S1309

ERFORM MOUSE EVENT FOR SEARCHING KEYWORDS —S1311

FIG. 14

▼ <form id="nx_search_form" name="search" action="?" method="get" role="search" onsubmit="return nx_form_submit(this)">
   ▼ <fieldset class="greenwindow">
      <legend>SEARCH</legend>
      <input type="hidden" name="sm" value="tab_hty.top">
      <input type="hidden" name="where" value="nexearch">
   ▼ <div class="greenbox"> == $0
      ▼ <span class="keyword">

1410 — <input type="text" id="nx_query" name="query" class="box_window" maxlength="255" accesskey="s" value="HOW TO MAKE KIMCHI STEW" autocomplete="off" title="SEARCH WORD INPUT">
      </span>
   </div>

```
▼<script type="text/javascript">...</script>
▼<div id="nautocomplete" class="autocomplete">...</div>
▶<button type="submit" class="bt_search" onmouseout=
"$Element(this).addClass('over');" onmouseout="$Element(this)
.removeClass('over down');"onmousedown="$Element(this)
.removeClass('over');$Element(this).addClass('down');">
    <span class="spnew ico_search">SEARCH</span>
</button>
▶<div class="ly_atcmp" id="nx_autoframe_top" style="display:
none;">...</div>
</fieldset>
</form>
```

1511, 1510, 1513

DISPLAY DEVICE

CROSS-REFERENCE TO RELATED APPLICATIONS

This application is the National Stage filing under 35 U.S.C. 371 of International Application No. PCT/KR2018/002070, filed on Feb. 20, 2018, the contents of which are all hereby incorporated by reference herein in its entirety.

TECHNICAL FIELD

The present disclosure relates to a display device.

BACKGROUND ART

Digital TV services using wired or wireless communication networks are becoming common. Digital TV service may provide a variety of services that could not be provided in the conventional analog broadcasting service.

For example, IPTV (Internet Protocol Television), which is a type of digital TV service, and smart TV service provide bidirectionality that allows a user to actively select a type of viewing the program and viewing time. IPTV, smart TV service may provide a variety of additional services, such as Internet search, home shopping, and online games based on this bidirectionality.

In addition, in recent years, many services that recognize a user's voice and perform a function corresponding to the recognized voice have been provided.

Existing TV speech recognition solutions support only pre-registered sites when a user wants to open a specific website using voice.

For example, when a user speaks <Open nanda in web browser>, a natural language processing server (NLP server) manually provides <www.nanda.com> mapped to nanda to a TV.

The TV accesses <www.nanda.com> provided by the NLP server and drives a web browser.

If the user speaks website name associated with nanda, such as <Open nanda music in web browser> or <Open nanda map in web browser>, the NLP server does not have corresponding information because the name of the website is not a previously registered website name.

Therefore, the TV is unable to provide a website corresponding to the website name associated with the nanda spoken by the user.

DISCLOSURE

Technical Problem

An object of the present disclosure is to provide a display device that allows a user to access a website corresponding to a voice command spoken by a user, even if the website is not a previously registered website.

Another object of the present disclosure is to provide a display device capable of automatically executing content by accessing a website corresponding to a voice command spoken by a user.

Another object of the present disclosure is to provide a display device capable of automatically providing a search result by analyzing a code of a website.

Technical Solution

To achieve these and other advantages and in accordance with the purpose of the invention, as embodied and broadly described herein, there is provided a display device including: a display unit; a storage unit configured to store information on a web page; a microphone configured to receive a user's voice command; a network interface unit configured to perform communication with a natural language processing (NLP) server; and a controller configured to transmit text data of the voice command to the NLP server, to receive intention analysis result information corresponding to the voice command from the NLP server, to select, as a final candidate address, one of a plurality of candidate addresses related to a search word included in the received intention analysis result information if the search word is not stored in the storage unit, and to access a website corresponding to the selected final candidate address.

It is to be understood that both the foregoing general description and the following detailed description of the present disclosure are exemplary and explanatory and are intended to provide further explanation of the invention as claimed.

Advantageous Effects

According to various embodiments of the present disclosure, a user may quickly access a website and content with only a simple voice command, thus providing an improved user experience.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 11 to 15 are diagrams illustrating an operation method of a display device that automatically provides a search result by analyzing a code of a website according to an embodiment of the present disclosure.

MODE FOR INVENTION

Reference will now be made in detail to the embodiments of the present disclosure, examples of which are illustrated in the accompanying drawings. Wherever possible, the same reference numbers will be used throughout the drawings to refer to the same or like parts.

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, may have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS may be used.

Accordingly, since various applications are freely added or deleted on a general purpose OS kernel, a display device described herein, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
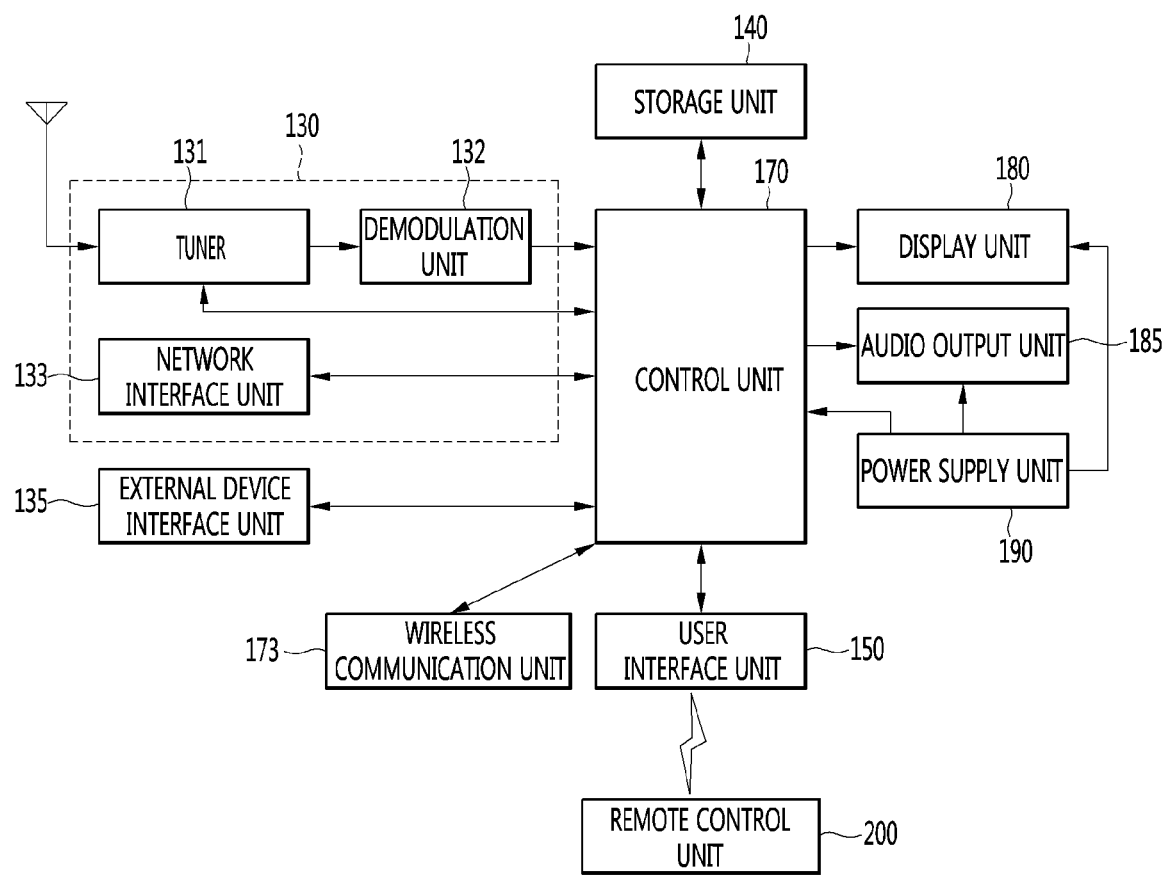
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception unit 130, an external device interface unit 135, a storage unit 140, a user interface unit 150, a controller 170, a wireless communication unit 173, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list in an adjacent external device and deliver it to the controller 170 or the storage unit 140.

The external device interface unit 135 may provide a connection path between the display device 100 and an external device. The external device interface unit 135 may receive at least one an image or audio output from an external device that is wirelessly or wiredly connected to the display device 100 and deliver it to the controller 170. The external device interface unit 135 may include a plurality of external input terminals. The plurality of external input terminals may include an RGB terminal, at least one High Definition Multimedia Interface (HDMI) terminal, and a component terminal.

An image signal of an external device input through the external device interface unit 135 may be output through the display unit 180. A voice signal of an external device input through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB Memory, and a home theater system, but this is just exemplary.

The network interface unit 133 may provide an interface for connecting the display device 100 to a wired/wireless network including the Internet network. The network interface unit 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface unit 133 may access a predetermined webpage through an accessed network or another network linked to the accessed network. In other words, the network interface unit 133 may transmit or receive data to or from a corresponding server by accessing a predetermined webpage through the network.

Then, the network interface unit 133 may receive contents or data provided from a content provider or a network operator. In other words, the network interface unit 133 may receive contents such as movies, advertisements, games, VODs, and broadcast signals, which are provided from a content provider or a network provider, through network and information relating thereto.

Additionally, the network interface unit 133 may receive firmware update information and update files provided from a network operator and transmit data to an Internet or content provider or a network operator.

The network interface unit 133 may select and receive a desired application among applications open to the air, through network.

The storage unit 140 may store signal-processed image, voice, or data signals stored by a program in order for each signal processing and control in the controller 170.

Additionally, the storage unit 140 may perform a function for temporarily storing image, voice, or data signals output from the external device interface unit 135 or the network interface unit 133 and may store information on a predetermined image through a channel memory function.

The storage unit 140 may store an application or an application list input from the external device interface unit 135 or the network interface unit 133.

The display device 100 may play content files (for example, video files, still image files, music files, document files, application files, and so on) stored in the storage unit 140 and provide them to a user.

The user interface unit 150 may deliver signals input by a user to the controller 170 or deliver signals from the controller 170 to a user. For example, the user interface unit 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user interface unit 150 may deliver, to the controller 170, control signals input from local keys (not illustrated) such as a power key, a channel key, a volume key, and a setting key.

Image signals that are image-processed in the controller 170 may be input to the display unit 180 and displayed as an image corresponding to corresponding image signals. Additionally, image signals that are image-processed in the controller 170 may be input to an external output device through the external device interface unit 135.

Voice signals processed in the controller 170 may be output to the audio output unit 185. Additionally, voice signals processed in the controller 170 may be input to an external output device through the external device interface unit 135.

Besides that, the controller 170 may control overall operations in the display device 100. Additionally, the controller 170 may control the display device 100 by a user command or internal program input through the user interface unit 150 and download a desired application or application list into the display device 100 in access to network.

The controller 170 may output channel information selected by a user together with processed image or voice signals through the display unit 180 or the audio output unit 185.

Additionally, according to an external device image playback command received through the user interface unit 150, the controller 170 may output image signals or voice signals of an external device such as a camera or a camcorder, which are input through the external device interface unit 135, through the display unit 180 or the audio output unit 185.

Moreover, the controller 170 may control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

The wireless communication unit 173 may perform a wired or wireless communication with an external electronic device. The wireless communication unit 173 may perform short-range communication with an external device. For this, the wireless communication unit 173 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a communicable wearable device around the display device 100. Furthermore, if the detected wearable device is a device authenticated to communicate with the display device 100, the controller 170 may transmit at least part of data processed in the display device 100 to the wearable device through the wireless communication unit 173. Accordingly, a user of the wearable device may use the data processed in the display device 100 through the wearable device.

The display unit 180 may convert image signals, data signals, or on-screen display (OSD) signals, which are processed in the controller 170, or images signals or data signals, which are received in the external device interface unit 135, into R, G, and B signals to generate driving signals.

Meanwhile, the display device 100 illustrated in FIG. 1 is just an embodiment of the present disclosure and thus, some of the components illustrated may be integrated, added, or omitted according to the specification of the actually implemented display device 100.

In other words, if necessary, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

Figure 2:
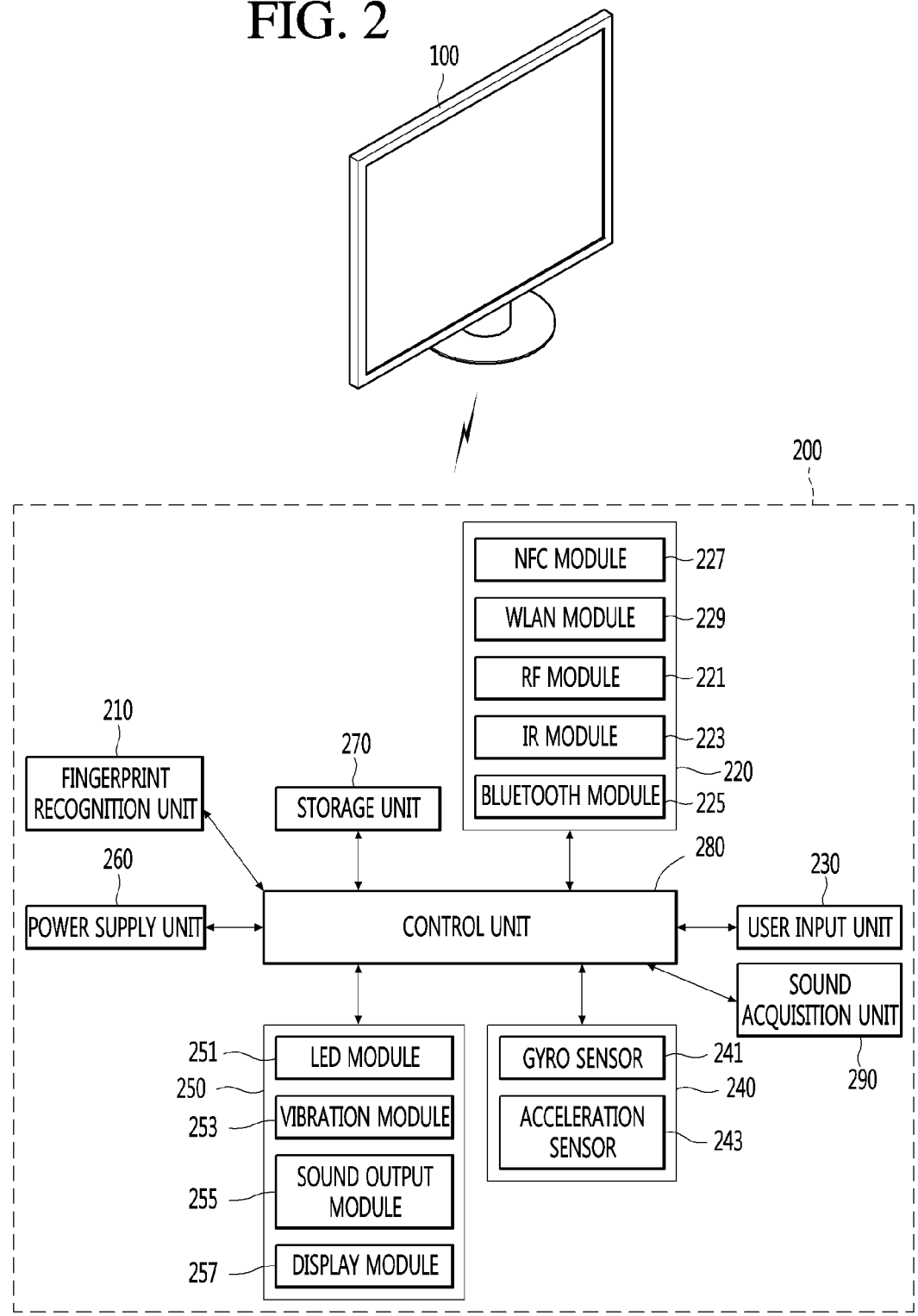
FIG. 2 is a block diagram illustrating a remote control device according to an embodiment of the present disclosure.
Figure 3:
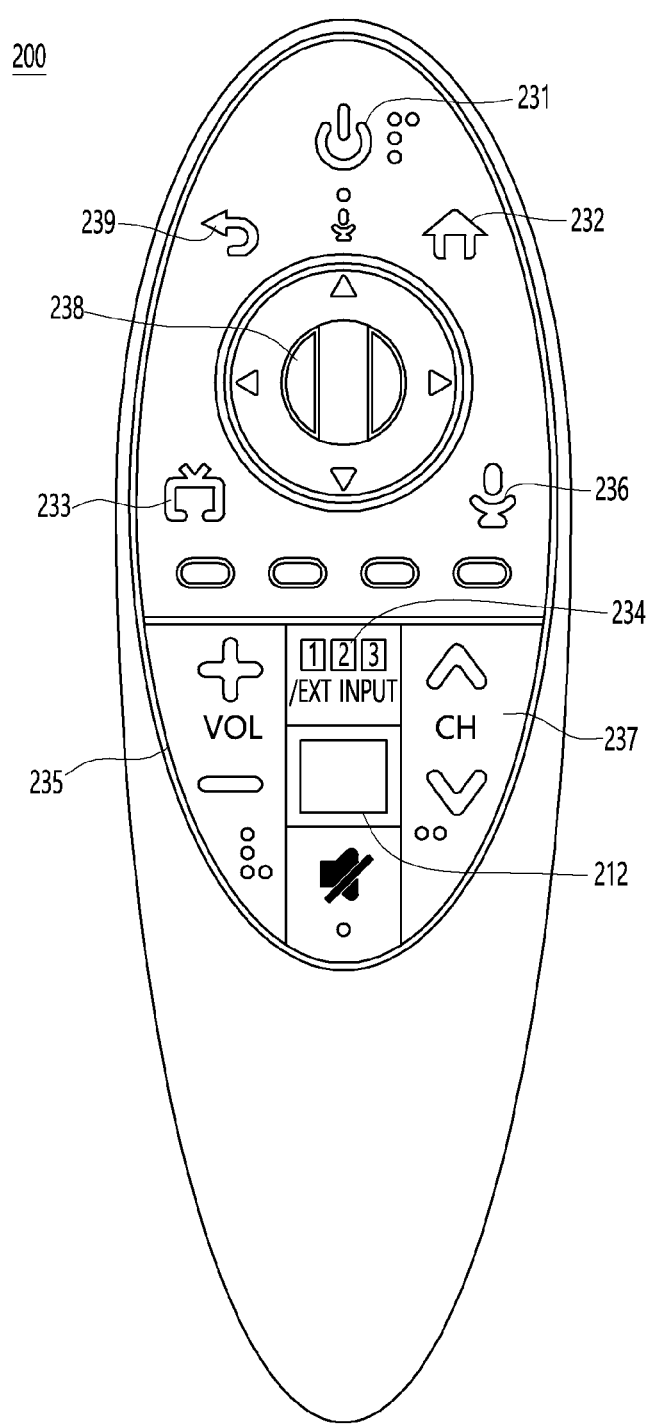
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 may transmit signals containing information on a movement of the remote control device 200 to the display device 100 through the wireless communication unit 220.

Moreover, the remote control device 200 may receive signals transmitted from the display device 100 through the RF module 221 and if necessary, may transmit a command on power on/off, channel change, and volume change to the display device 100 through the IR module 223.

The user input unit 230 may be configured with a keypad button, a touch pad, or a touch screen. A user may manipulate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The voice adjustment button 235 may be a button for adjusting the size of a volume output from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

FIG. 2 will be described again.

If the user input unit 230 includes a touch screen, a user may touch a soft key of the touch screen to input a command relating to the display device 100 to the remote control device 200. Additionally, the user input unit 230 may include various kinds of input means manipulated by a user, for example, a scroll key and a jog key, and this embodiment does not limit the scope of the present disclosure.

The sensor unit 240 may include a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display unit 180 of the display device 100.

The output unit 250 may output image or voice signals corresponding to manipulation of the user input unit 235 or corresponding to signals transmitted from the display device 100. A user may recognize whether the user input unit 235 is manipulated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste may be reduced. The power supply unit 260 may resume the power supply if a predetermined key provided at the remote control device 200 is manipulated.

The storage unit 270 may store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage unit 270, information on a frequency band for transmitting/receiving signals to/from the display device 100 paired with the remote control device 200 and refer to it.

The controller 280 controls general matters relating to control of the remote control device 200. The controller 280 may transmit a signal corresponding to a predetermined key manipulation of the user input unit 235 or a signal corresponding to movement of the remote control device 200 sensed by the sensor unit 240 to the display device 100 through the wireless communication unit 225.

Additionally, the voice acquisition unit 290 of the remote control device 200 may obtain voice.

The voice acquisition unit 290 may include at least one microphone 291 and obtain voice through the microphone 291.

Figure 4:
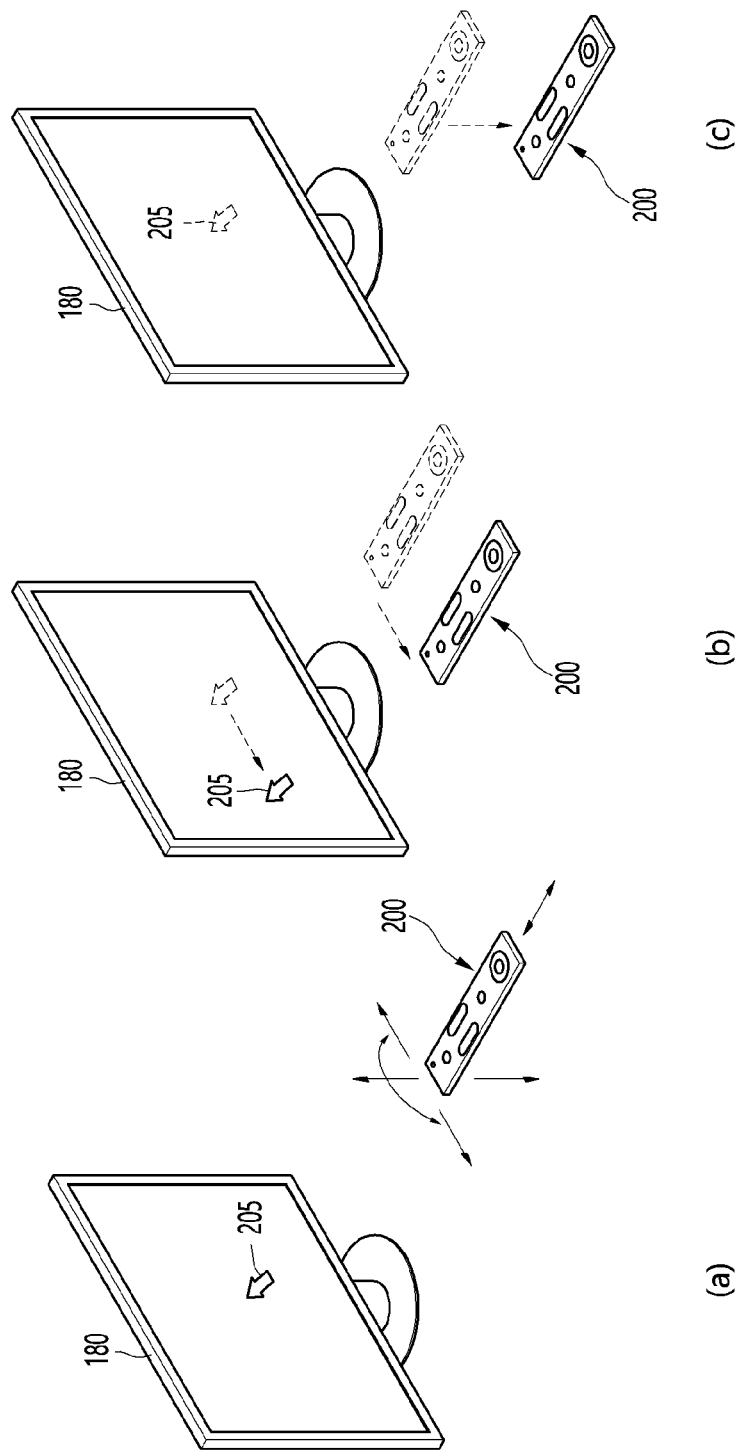
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 may be zoomed in and displayed larger. On the contrary, if the user moves the remote control device 200 to approach the display unit 180, the selection area in the display unit 180 corresponding to the pointer 205 may be zoomed out and reduced.

Meanwhile, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. In other words, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Hereinafter, a configuration of a speech recognition system according to an embodiment of the present disclosure will be described with reference to FIG. 5.

Figure 5:
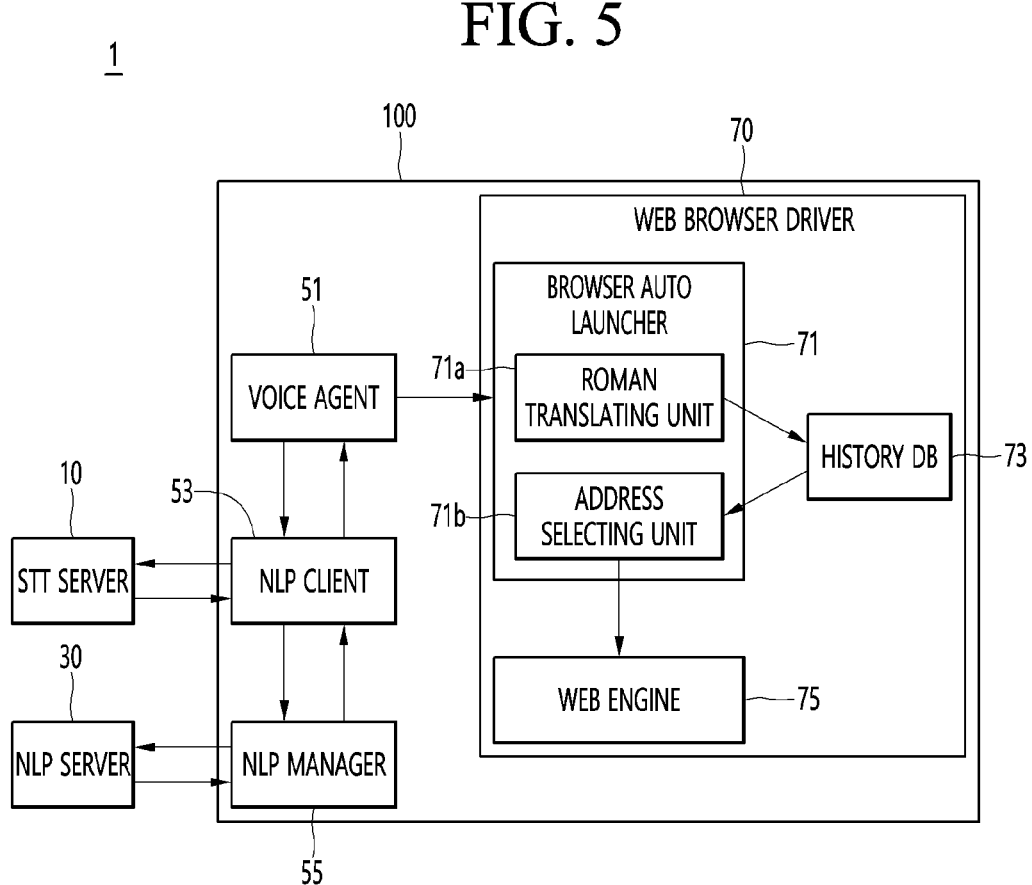
FIG. 5 is a block diagram illustrating a configuration of a speech recognition system according to an embodiment of the present disclosure.

FIG. 5 is a block diagram illustrating a configuration of a speech recognition system according to an embodiment of the present disclosure.

Referring to FIG. 5, a speech recognition system 1 may include a display device 100, a speech-to-text (STT) server 10, and a natural language processing (NLP) server 30.

The display device 100 may exchange information with the STT server 10 and the NLP server 30.

The display device 100 may receive a user's voice command and transmit voice data corresponding to the received voice command to the STT server 10.

The STT server 10 may transform voice data received from the display device 100 into text data and transmit the transformed text data to the display device 100.

The display device 100 may transmit the received text data to the NLP server 30.

The NLP server 30 may perform natural language processing (NLP) based on the text data received from the display device 100. The NLP server 30 may generate intention analysis result information reflecting an intention analysis result according to a result of performing the natural language processing, and transmit the generated intention analysis result information to the display device 100.

The display device 100 may access a specific website based on the received intention analysis result information.

In addition to the components of FIG. 1, the display device 100 may further include a voice agent 51, an NLP client 53, an NLP manager 55, and a web browser driver 70.

The voice agent 51 may request the NLP client 53 to enter a voice recognition mode according to a control signal for entering the voice recognition mode received from a remote control device 200.

In addition, the voice agent 51 may display a user interface (UI) indicating the entry into the voice recognition mode on the display unit 180 according to the control signal.

The NLP client 53 may cause an operation mode of the display device 100 to enter the voice recognition mode according to a request to enter the voice recognition mode. The NLP client 53 may receive a user's voice command and translate the received voice command into voice data.

The NLP client 53 may transmit voice data to the STT server 10.

The NLP client 53 may transmit voice data to the STT server 10 through the network interface unit 133.

The NLP client 53 may deliver the text data received from the STT server 10 to the NLP manager 55.

The NLP manager 55 may determine whether it is able to perform a function corresponding to the text data by itself based on the text data.

The NLP manager 55 may perform the corresponding function when it is determined that the NLP manager 55 can perform the function corresponding to the text data by itself. For example, when the function corresponding to the text data is one of power on/off, channel change, and volume control of the display device 100, the NLP manager 55 may perform the corresponding function.

The NLP manager 55 may transmit the text data to the NLP server 30 when it is determined that the NLP manager 55 cannot perform the function corresponding to the text data by itself.

The NLP manager 55 may receive intention analysis result information corresponding to text data from the NLP server 30.

The NLP manager 55 may deliver the received intention analysis result information to the NLP client 53.

The NLP client 53 may deliver the received intention analysis result information to the voice agent 51, and the voice agent 51 may deliver a search word included in the intention analysis result information to the web browser driver 70.

The intention analysis result information may also include a natural language for driving a web browser.

The web browser driver 70 may drive a web browser and obtain an address of a website corresponding to the search word.

The web browser driver 70 may include a browser auto launcher 71, a history DB 73, and a web engine 75.

The browser auto launcher 71 may determine whether the search word included in the intention analysis result information is stored in the history DB 73 and select an address of the website according to a determination.

The browser auto launcher 71 may include a Roman translating unit 71a and an address selecting unit 71b.

The Roman translating unit 71a may translate the search word into a Roman alphabet.

The Roman translating unit 71a may determine whether the search word or the search word translated into a Roman alphabet is stored in the history DB 73.

When website information including the search word or the search word translated into a Roman alphabet is stored in the history DB 73, the address selecting unit 71b may select a website address corresponding to the website information as an address to be accessed.

When website information including the search word or the search word translated into a Roman alphabet is not stored in the history DB 73, the address selecting unit 71b obtains a plurality of candidate addresses and selects one of the plurality of candidate addresses, as a final candidate address. This will be described later in detail.

The history DB 73 may store a page title indicating a name of a web page accessed by a user, a link title and a link address corresponding to the link title, a website address, and a page text included in the web page.

The history DB 73 may be included in the storage unit 140 of FIG. 1.

The web engine 75 may access the address of the website selected by the address selecting unit 71b.

The voice agent 51, the NLP client 53, the NLP manager 55, and the web browser driver 70 may be included in the controller 170.

Meanwhile, in FIG. 5, the STT server 10 and the NLP server 30 are described as separate components, but the STT server 10 and the NLP server 30 may be implemented as a single server.

Figure 6:
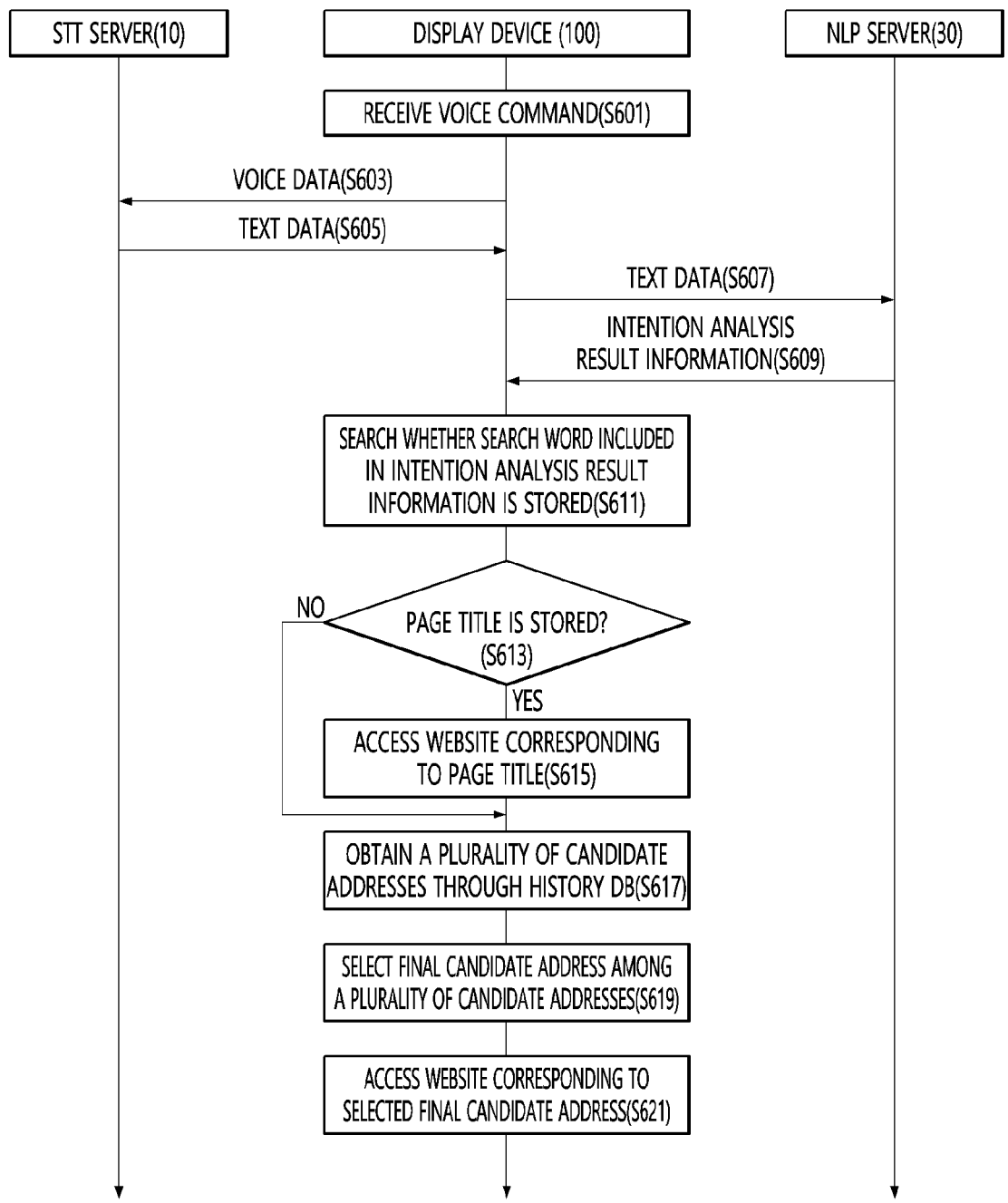
FIG. 6 is a ladder diagram illustrating an operation method of a speech recognition system according to an embodiment of the present disclosure.

FIG. 6 is a ladder diagram illustrating an operation method of a speech recognition system according to an embodiment of the present disclosure.

Referring to FIG. 6, the controller 170 of the display device 100 receives a voice command (S601).

In an embodiment, the display device 100 may include a microphone and receive a user's voice command through the microphone.

In another embodiment, the wireless communication unit 173 of the display device 100 may receive a voice command from the remote control device 200. That is, the user may speak a voice command through the remote control device 200, and the spoken voice command may be transmitted to the display device 100 through the remote control device 200.

For example, the remote control device 200 may include a voice recognition button, and when the voice recognition button is selected, the remote control device 200 may transmit a control signal for operating an operation mode of the display device 100 as a voice recognition mode to the display device 100. The display device 100 may cause the operation mode of the display device 100 to enter the voice recognition mode according to the received control signal.

In the voice recognition mode, the microphone provided in the display device 100 may be activated.

The controller 170 of the display device 100 may translate voice data corresponding to a voice command into text data by itself and may have a function of performing natural language processing on the text data. When the controller 170 is able to analyze an intention of the voice command through a natural language processing module therein, the controller 170 may not transmit the text data corresponding to the voice command to the NLP server 30.

For example, when the voice command is <Turn off TV power>, the controller 170 may analyze an intention of the voice command and turn off power of the display device 100 according to an analysis result.

In an embodiment, when the translated text data of the voice command is stored in the storage unit 140, the controller 170 may perform the function of the display device 100 corresponding to the text data itself.

Examples of functions of the display device 100 that the controller 170 may perform based on natural language processing of voice commands may include one or more of power on/off, channel change, and volume control of the display device 100.

In the embodiment of FIG. 6, it will be described on the assumption that a user's voice command is <Open nanda music>.

The controller 170 of the display device 100 transmits voice data corresponding to the received voice command to the STT server 10 (S603).

The controller 170 of the display device 100 may transmit voice data to the STT server 10 through the network interface unit 133.

The STT server 10 may translate voice data received from the display device 100 into text data, and transmit the translated text data to the display device 100 (S605).

The controller 170 of the display device 100 transmits text data received from the STT server 10 to the NLP server 30 (S607).

The controller 170 of the display device 100 may transmit text data to the NLP server 30 through the network interface unit 133.

The NLP server 30 performs intention analysis based on the text data received from the display device 100 and transmits intention analysis result information indicating a result of performing the intention analysis to the display device 100 (S609).

The NLP server 30 may analyze a user's intention based on text data received from the display device 100.

The NLP server 10 may analyze the text data according to a natural language processing technique and perform analysis on a user's intention. The natural language processing technique is a technique that mechanically analyzes natural language and outputs a result in a form that a computer may understand, or outputs a language that a human may understand.

In an embodiment, the intention analysis result information may include a search word that the user wants to search. For example, when the user speaks <Open nanda music>, the user's intention may be considered as an intention to view a website corresponding to nanda music.

In this case, the search word may be <Nanda music>.

The controller 170 of the display device 100 determines whether the search word included in the received intention analysis result is stored in the history DB 73 (S611).

In an embodiment, the history DB 73 may store an address (URL) of a website, a page title of the website, a link title and a link address corresponding to the link title, and a page text.

The page title of the website may be a name of the website.

The link title may be a title allowing access to a specific address in a web page of a website. When the link title is selected, a link address corresponding to the link title may be accessed.

The page text may be a text displayed on a web page.

The information stored in the history DB 73 will be described in detail with reference to FIG. 7.

Figure 7:
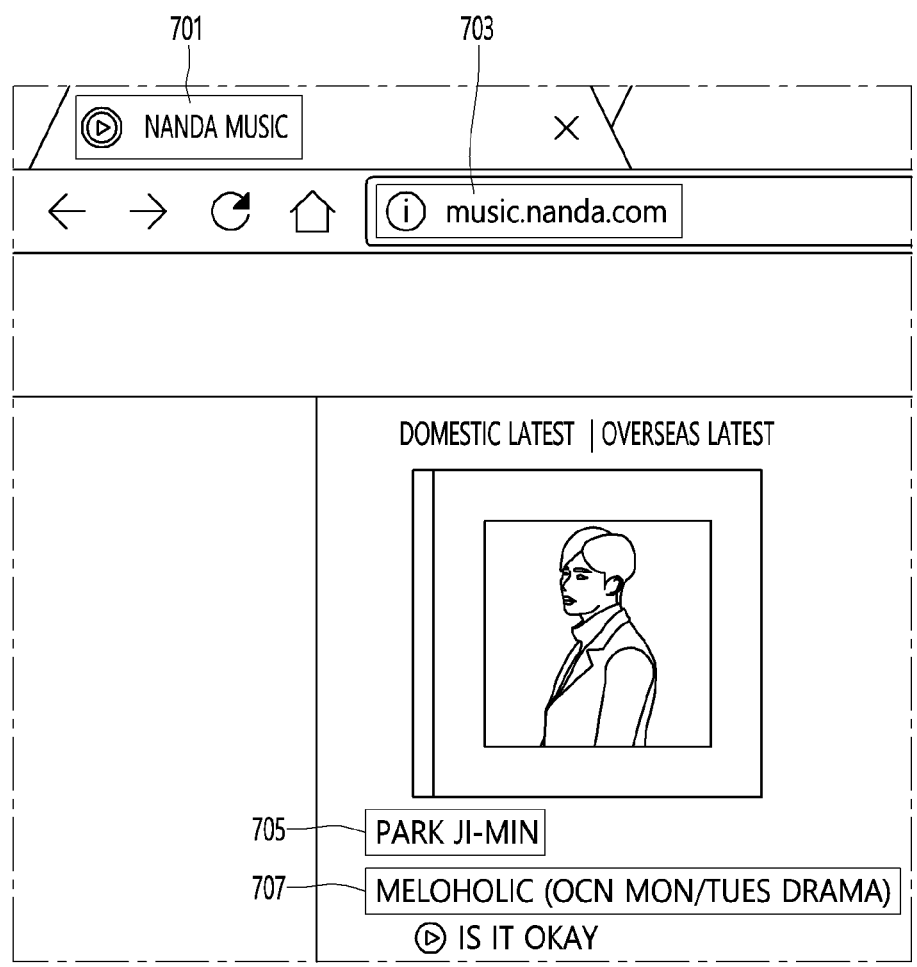
FIG. 7 is a view illustrating information stored in a history DB according to an embodiment of the present disclosure.

FIG. 7 is a view illustrating information stored in the history DB according to an embodiment of the present disclosure.

Referring to FIG. 7, a web page 700 is illustrated.

The web page 700 may include a page title 701, a website address 703, a link title 705, and a page text 707.

The page title 701 may indicate a name of the website, and <Nanda music> may be the page title 701 in FIG. 7.

The address 703 of the website may be an address indicating where a resource is located on the network. In FIG. 7, <music.Nanda.com> may be an address 703 of the website.

The link title 705 may be a title allowing access to an address of a specific website. For example, when the link title 705 of <Park Ji-min> is selected, the display device 100 may access a link address corresponding to the link title 705. The link address may also be an address of a specific website.

The page text 707 may include a text included in the web page 700.

When accessing the specific website, the controller 170 of the display device 100 may extract the page title 701 of the website, the address 703 of the website, the link title 705, and the page text 707 and store the same in the history DB 73.

The controller 170 of the display device 100 may store the page title 701 of the website, the address 703 of the website, the link title 705, and the page text 707 as a group. That is, the page title 701 of the website, the address 703 of the website, the link title 705, and the page text 707 may be matched to each other and stored.

FIG. 6 will be described again.

When the page title including the search word is stored in the history DB 73 (S613), the controller 170 of the display device 100 accesses a website corresponding to the page title (S615).

In an embodiment, when the page title including the search word is stored in the history DB 73, the controller 170 may extract the address of the website matched to the page title.

The controller 170 may control the web browser driver 70 to access the extracted address of the website.

The controller 170 may access the address of the website and display a corresponding web page on the display unit 180.

When a page title including the search word is not stored in the history DB 73, the controller 170 of the display device 100 obtains a plurality of candidate addresses through the history DB (S617).

In an embodiment, the controller 170 may obtain a plurality of candidate addresses using a first ratio in which the search word overlaps the page title or the link title, a second ratio in which the search word overlaps with the page text, and a third ratio in which the Roman-translated search word and the address of the website overlap each other.

When the first ratio is greater than or equal to a reference ratio, the controller 170 may obtain an address of a website matched to the corresponding page title or the link title, as a candidate address.

When the second ratio is greater than or equal to the reference ratio, the controller 170 may obtain an address of a website matched to the corresponding page text, as a candidate address.

When the third ratio is greater than or equal to the reference ratio, the controller 170 may obtain an address of the corresponding website as a candidate address.

The controller 170 of the display device 100 selects a final candidate address from among the plurality of obtained candidate addresses (S619) and accesses a website corresponding to the selected final candidate address (S619).

In an embodiment 183, the controller 170 may give different weights to the first ratio, the second ratio, and the third ratio and select the final candidate address using the given weights.

For example, the first ratio may be given a weight of 1.5, the second ratio may be given a weight of 1.2, and the third ratio may be given a weight of 1.

The controller 170 may obtain weight calculation values through products between each ratio and a weight corresponding thereto, and select a candidate address corresponding to the largest weight calculation value among the obtained weight calculation values as a final candidate address.

Hereinafter, a process of selecting a final candidate address among a plurality of candidate addresses will be described with reference to FIG. 8.

Figure 8:
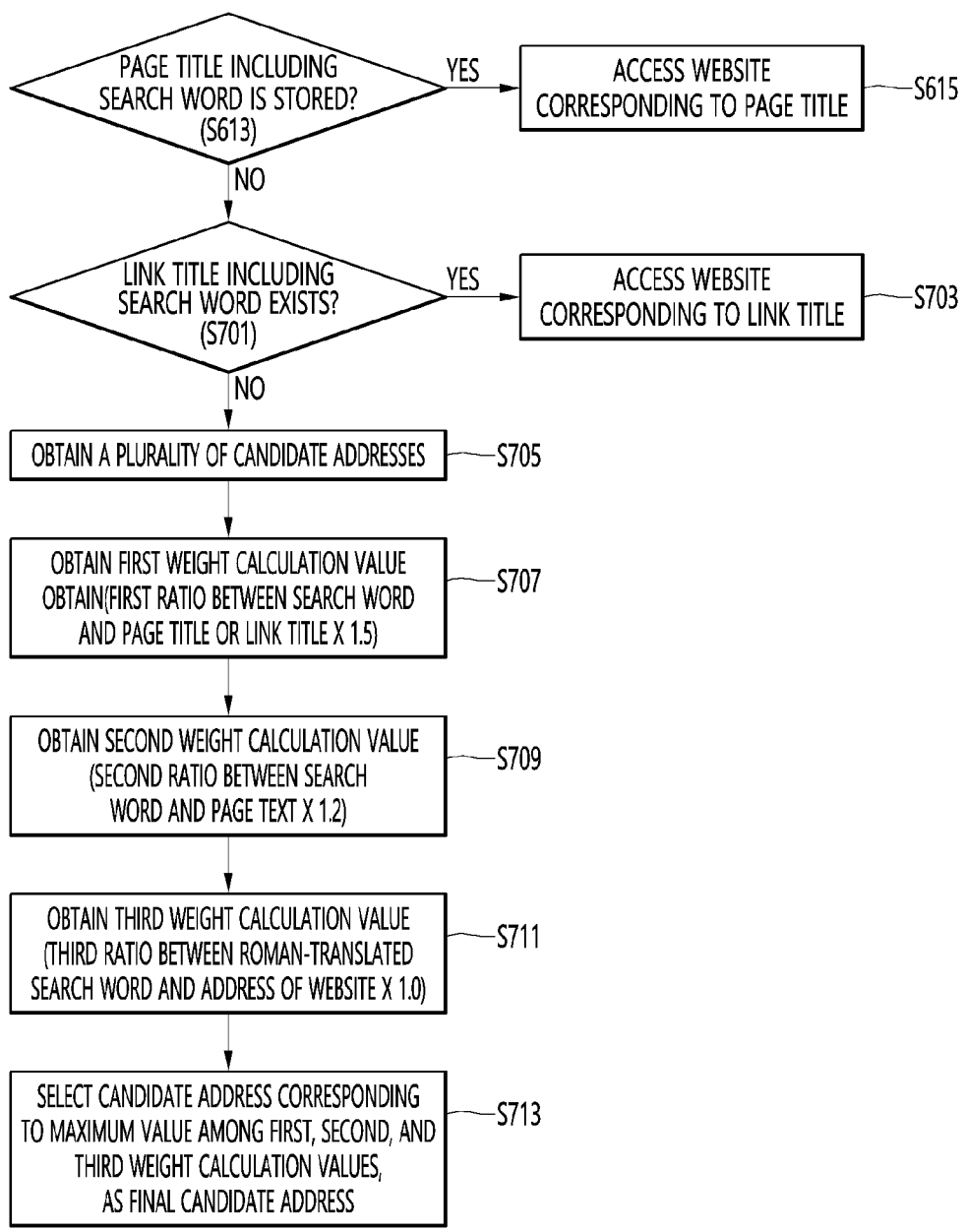
FIG. 8 is a flowchart illustrating a process of selecting a final candidate address among a plurality of candidate addresses according to an embodiment of the present disclosure.

FIG. 8 is a flowchart illustrating a process of selecting a final candidate address among a plurality of candidate addresses according to an embodiment of the present disclosure.

FIG. 8 is a view specifically illustrating steps S613 to S619 of FIG. 6.

Referring to FIG. 8, the controller 170 of the display device 100 determines whether a page title including a search word is stored in the history DB 73 (S613).

When the page title including the search word is stored in the history DB 73, the controller 170 extracts an address of a website corresponding to the page title and accesses the extracted website address (S615).

When the page title including the search word is not stored in the history DB 73, the controller 170 determines whether a link title including the search word exists in the history DB 73 (S701).

When the link title including the search word exists in the history DB 73, the controller 170 extracts an address of a website corresponding to the searched link title and accesses the extracted address of the website (S703).

When the link title including the search word does not exist in the history DB 73, the controller 170 obtains a plurality of candidate addresses (S705).

In an embodiment, the controller 170 may calculate a first ratio indicating the degree of matching between the search word and each of the plurality of page titles stored in the history DB 73 or the degree of matching between the search word and each of the plurality of link titles. Here, the degree of matching may be obtained by comparing a character of the search word with a character of the page title or a character of the link title.

For example, if the number of characters in the search word is 5, the number of characters in the page title is 7, and the number of characters matching the characters in the page title among the characters in the search word is 3, the first ratio may be 3/5.

When the first ratio is greater than or equal to the reference ratio, the controller 170 may register an address of a website corresponding to the page title or the link title as a candidate address. Here, the reference ratio is 50%, but this is merely an example.

In an embodiment, the controller 170 may calculate a second ratio indicating the degree of matching between the search word and each of a plurality of page texts stored in the history DB 73.

When the second ratio is greater than or equal to the reference ratio, the controller 170 may register an address of a website matched to the corresponding page text as a candidate address.

In an embodiment, the controller 170 may calculate a third ratio indicating the degree of matching between the search word translated into Roman characters and the address of the website stored in the history DB 73.

For example, if the number of alphabets of the search word translated into Roman characters is 10, the number of characters of the address of the website is 15, and the number of matched characters is 7, the third ratio may be 7/10.

When the third ratio is greater than or equal to the reference ratio, the controller 170 may register the address of the corresponding website as a candidate address.

The controller 170 obtains a first weight calculation value obtained by multiplying the first ratio indicating the degree of matching between the search word and the page title or the link title by a weight of 1.5 (S707).

The controller 170 obtains a second weight calculation value obtained by multiplying a second ratio indicating the degree of matching between the search word and the page text by a weight of 1.2 (S709).

The controller 170 obtains a third weight calculation value obtained by multiplying a third ratio indicating the degree of matching between the search word translated into Roman characters and the link title by a weight of 1.0 (S711).

The controller 170 selects a candidate address corresponding to a maximum value among the first, second, and third weight calculation values as a final candidate address (S713).

Thereafter, the controller 170 accesses a website of the selected final candidate address.

Next, an operation method of a speech recognition system according to another embodiment of the present disclosure will be described.

Figure 9:
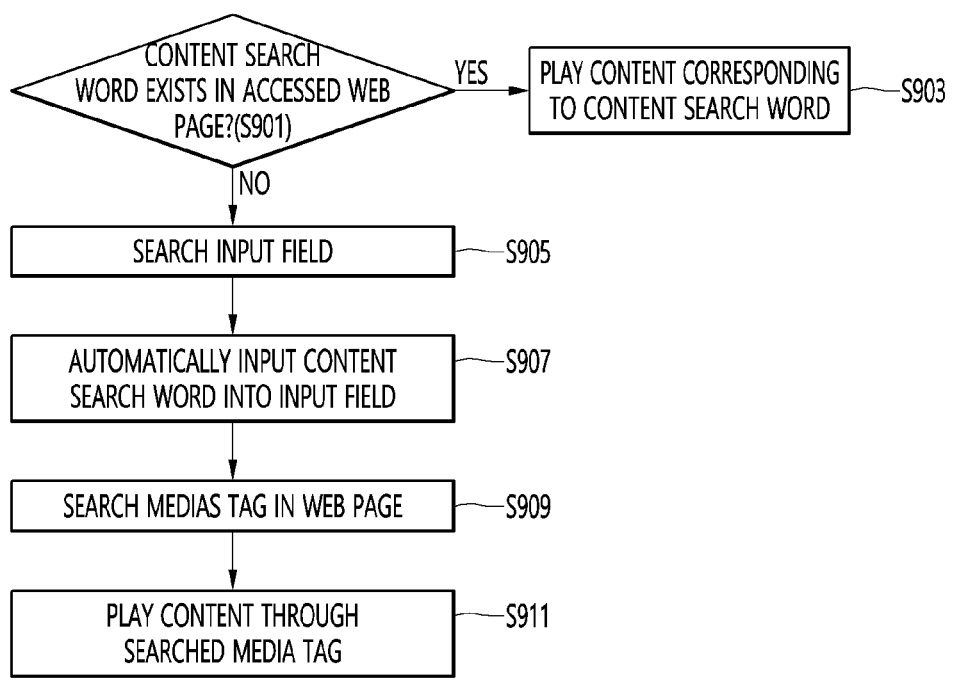
FIG. 9 is a ladder diagram illustrating an operation method of a speech recognition system according to another embodiment of the present disclosure.

FIG. 9 is a ladder diagram illustrating an operation method of a speech recognition system according to another embodiment of the present disclosure.

In particular, FIG. 9 is based on the embodiment of FIGS. 6 and 8. FIG. 6 illustrates a method for opening a website intended by the user through speech recognition and FIG. 9 illustrates a method for opening a website intended by the user and playing content in the opened website intended by the user through speech recognition.

In FIG. 9, it is assumed that a user's voice command is <play Susan's autumn morning in nanda music>.

In this case, the intention analysis result information received from the NLP server 30 by the display device 100 may include a website search word and a content search word.

The website search word may be <Nanda music>, and the content search word may be <Susan's Fall Morning>. <Nanda music> is a page title of the website, <Susan> is a singer's name, and <Autumn Morning> is a title of a song of the singer.

FIG. 9 may be a flowchart performed after the ladder diagram of FIG. 6.

The controller 170 of the display device 100 determines whether a content search word exists in the accessed web page (S901).

For example, the controller 170 may determine whether a content search word <Susan's Autumn Morning> exists in the web page 700 shown in FIG. 7.

If the content search word exists in the accessed web page, the controller 170 plays content corresponding to the content search word (S903).

For example, when the content search word <Susan's Autumn Morning> exists in the web page 700 shown in FIG. 7, the controller 170 may search an HTML media tag of the web page 700 and play <Susan's Autumn Morning> using the searched media tag.

When there is no content search word in the accessed web page, the controller 170 searches an input field in the web page (S905).

In an embodiment, the input field may be a field for searching content in the web page.

The controller 170 automatically inputs a content search word to the searched input field (S907).

The controller 170 searches a media tag for playing the content from the accessed web page according to the input of the content search word (S909).

The controller 170 automatically plays the content corresponding to the content search word using the searched media tag (S911).

In this way, the user may easily access a specific website and enjoy desired content on the corresponding website with a simple voice command.

Figure 10:
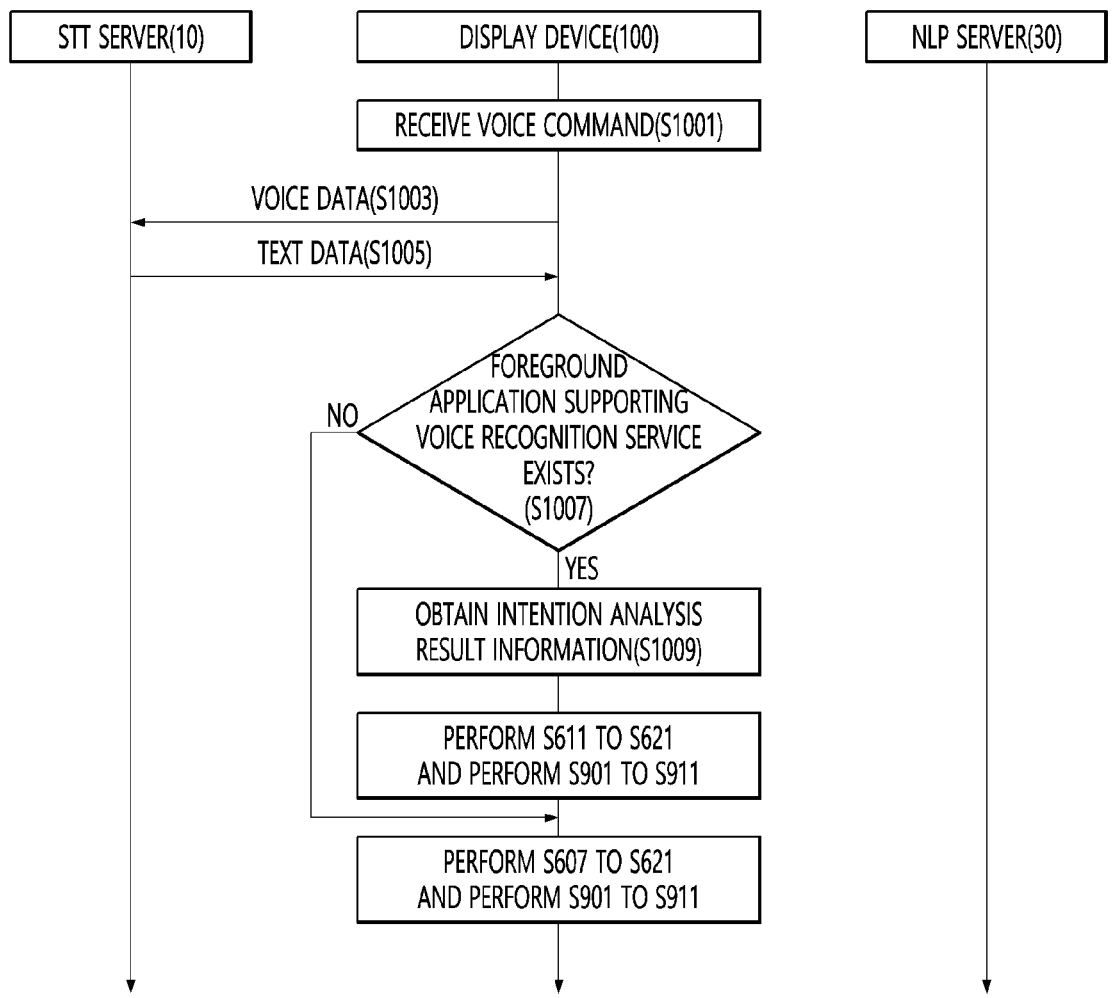
FIG. 10 is a ladder diagram illustrating an operation method of a speech recognition system according to another embodiment of the present disclosure.

FIG. 10 is a ladder diagram illustrating an operation method of a speech recognition system according to another embodiment of the present disclosure.

In particular, FIG. 10 illustrates an embodiment of a case in which there is a foreground application in which an application supporting a voice recognition service installed in the display device 100 continuously operates.

Specifically, FIG. 10 illustrates an embodiment in which the display device 100 first accesses a website through voice recognition and automatically plays content using a foreground application, rather than sending text data received from the STT server 10 to the NLP server 30.

Referring to FIG. 10, the controller 170 of the display device 100 receives a voice command (S1001).

The controller 170 of the display device 100 transmits voice data corresponding to the received voice command to the STT server 10 (S1003).

The STT server 10 translates the voice data received from the display device 100 into text data, and transmits the translated text data to the display device 100 (S1005).

The NLP client 53 of the controller 170 determines whether there is a foreground application supporting a voice recognition service (S1007).

In an embodiment, the foreground application may be an application continuously run in the display device 100 and may be an application capable of performing speech recognition and natural language processing services.

When there is a foreground application supporting a voice recognition service, the NLP client 53 of the controller 170 obtains intention analysis result information corresponding to the text data using the corresponding application (S1009).

In an embodiment, the intention analysis result information may include a website search word for searching a website and a content search word for playing content in the website.

Thereafter, the controller 170 sequentially performs steps S611 to S621 of FIG. 6 and steps S901 to S911 of FIG. 9.

If there is no foreground application that supports the speech recognition service, the controller 170 sequentially performs steps S607 to S621 in FIG. 6 and step S911 in FIG. 9.

In other words, when the foreground application supporting the speech recognition service is not used, the controller 170 may transmit text data to the NLP server 30 and receive the intention analysis result information corresponding to the text data and perform subsequent steps.

Next, an operation method of the display device 100 according to another embodiment of the present disclosure will be described.

FIGS. 11 to 15 are views illustrating an operation method of a display device according to another embodiment of the present disclosure.

Figure 11:
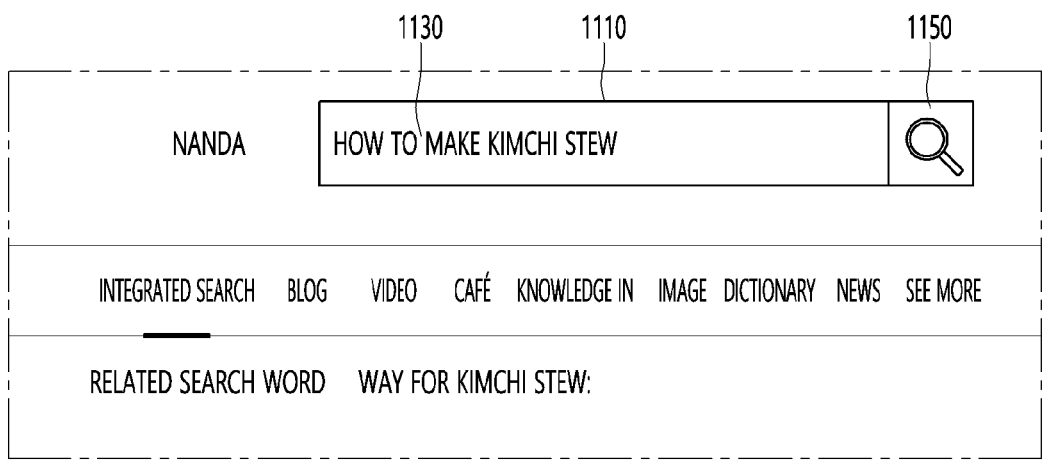

Referring to FIG. 11, a web page 1100 is shown. It is assumed that an address of the web page 1100 is <www.nanda.com>.

The web page 1100 may include a search input field 1110 in which a search word may be input, a search word 1130 input by the user, and a magnifying glass icon 1150 for execution of a search result for the search word 1130.

The display device 100 checks a query of a URL input window and determines whether the checked query is stored in a database.

That is, when a search request for the search word 1130 is received, the display device 100 generates a URL corresponding to the search word 1130 using the query in the database.

Figure 12A:
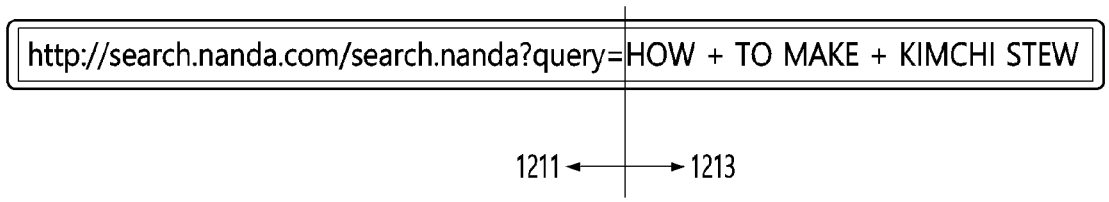

For example, when a search word 1130 of <how to make kimchi stew> is input in the search input field 1110 of the web page 1100, the display device 100 may generate a query 1210 as shown in FIG. 12A.

The generated query 1210 may include a query address 1211 and a keyword combination 1213 of the search word 1130.

Figure 12B:
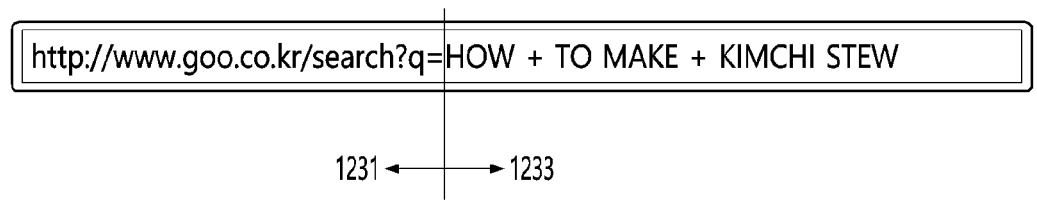

FIG. 12B shows a query 1230 of another web page having a web address of <www.goo.co.kr>.

The query 1230 of another web page includes a query address 1231 and a keyword combination 1303.

As such, different web pages have different query addresses for the same search word 1130.

In addition, an operator of each website may frequently change the query address, and thus, in case of performing searching using the query address, there is a loss of paying the operator of each website or continuously managing the query address.

The present disclosure proposes a method in which a user may easily perform searching using only a representative address of a website.

FIG. 13 is a flowchart illustrating an operation method of the display device 100 according to an embodiment of the present disclosure.

Hereinafter, it is assumed that a search input is obtained through the intention analysis result information obtained according to a user's voice command described in the embodiment of FIG. 6.

In addition, it is assumed that a user's voice command is <Look for a way to make kimchi stew from nanda TV>.

Also, it is assumed that the display device 100 is connected to a website called <www.NANDATV.com> according to a user's voice command. In this case, the display device 100 may access the corresponding website using the embodiment of FIG. 6.

Referring to FIG. 13, the controller 170 of the display device 100 receives a search input in a web page (S1301).

In an embodiment, the search input may be a content search word automatically input to a search input field according to S907 of FIG. 9. In this case, the content search word may be obtained through a user's voice command.

The controller 170 of the display device 100 obtains a source code of a web page according to the reception of the search input (S1303) and searches a keyword item whose input type is text in the obtained source code (S1305).

The controller 170 inserts keywords of the search input into a value of the keyword item (S1307).

This will be described with reference to FIG. 14.

FIG. 14 is a diagram showing a source code of a web page related to a keyword item according to an embodiment of the present disclosure.

The controller 170 may search a keyword item 1410 whose input type 1411 in the source code is "text".

The controller 170 may insert a combination of keywords <How+to make+kimchi stew> into the value 1413 of the keyword item 1410.

FIG. 13 will be described again.

The controller 170 searches a search execution item in the source code (S1309) and performs a mouse event for searching the inserted keywords (S1311).

This will be described with reference to FIG. 15.

FIG. 15 is a diagram illustrating a source code related to a search execution item according to an embodiment of the present disclosure.

The controller 170 may find a search execution item 1510 for searching a combination of keywords in the source code.

The controller 170 may search a search execution item 1510 in which a button type 1511 in the source code is "submit".

The controller 170 may perform a mouse event using a mouse down type 1513 in the search execution item 1510. Depending on the mouse event, a combination of keywords may be searched from the corresponding website.

As described above, according to the embodiment of FIG. 13, the display device 100 may automatically obtain a search result by analyzing the code of the website, without having to manage a query address of a specific website as a separate database.

Accordingly, a cost incurred for managing the database storing the query address may be reduced, and it is not necessary to periodically monitor the query address.

According to an embodiment of the present disclosure, the method described above may be implemented as a code readable by a processor in a medium on which a program is recorded. Examples of the processor-readable medium include a ROM, a RAM, a CD-ROM, a magnetic tape, a floppy disk, an optical data storage device, and the like and include a medium implemented in the form of a carrier wave (e.g., transmission through the Internet).

The display device described above is not limited to the configuration and method of the embodiments described above, and all or part of the embodiments may be selectively combined and configured to make various modifications.

The invention claimed is:

1. A display device comprising:
a display;
a memory configured to store information on a web page;
a microphone configured to receive a user's voice command;
a network interface configured to perform communication with a natural language processing (NLP) server; and
a controller configured to:
cause the network interface to transmit text data of the voice command to the NLP server, receive intention analysis result information corresponding to the voice command from the NLP server, select, as a final candidate address, one of a plurality of candidate addresses related to a search word included in the received intention analysis result information, based on the search word not being stored in the memory, and access a website corresponding to the selected final candidate address, wherein the memory is configured to store an address of the website, a page title indicating a name of the web page, a link title allowing access to a specific address in the web page of the website, a link address corresponding to the link title, and a page text including content of the web page.

2. The display device of claim 1, wherein the controller is configured to obtain the plurality of candidate addresses using a first ratio in which the search word and the page title or the link title overlap each other, a second ratio in which the search word overlaps the page text, and a third ratio in which a search word translated into a Roman alphabet overlaps an address of the website, based on the page title including the search word not being stored in the memory.

3. The display device of claim 2, wherein the controller is configured to obtain, as a candidate address, an address of a website matched to the corresponding page title or the corresponding link title if the first ratio is equal to or greater than a reference ratio, to obtain, as a candidate address, an address of a website matched to the corresponding page text if the second ratio is equal to or greater than the reference ratio, and to obtain, as a candidate address, an address of the corresponding website based on the third ratio not being equal to or greater than the reference ratio.

4. The display device of claim 3, wherein the controller is configured to give different weights to the first, second, and third ratios, respectively, and to select, as the final candidate address, a candidate address having a maximum value among values calculated by giving the weights.

5. The display device of claim 4, wherein a weight for the first ratio is greater than a weight for the second ratio, and the weight for the second ratio is greater than a weight for the third ratio.

6. The display device of claim 1, wherein the controller is configured to access an address of a website matched to the page title including the search word, based on the page title being stored in the memory.

7. The display device of claim 1, wherein the search word comprises a website search word for accessing the website and a content search word for searching a content in the web page.

8. The display device of claim 7, wherein the controller is configured to search a search input field in the web page and to automatically input the content search word to the search input field, based on the content search word not being included in the web page of the accessed website.

9. The display device of claim 8, wherein the controller is configured to search a media tag for playing the content and to automatically play the content corresponding to the content search word using the searched media tag.

10. The display device of claim 7, wherein the controller is configured to obtain a source code of the web page and to automatically search the search word based on the obtained source code.

11. The display device of claim 10, wherein the controller is configured to search a keyword item whose input type is a text in the source code, to insert a combination of keywords configuring the content search word into a value of the searched keyword item, to search a search execution item in the source code, and to perform a mouse event for searching the combination of the keywords.

12. The display device of claim 1, wherein the controller is configured to transmit voice data corresponding to the voice command to a speech-to-text (STT) server and to receive the text data from the STT server.

13. The display device of claim 1, wherein the controller is configured to cause an operation mode of the display device to enter a voice recognition mode according to a control signal received from a remote control device.

14. The display device of claim 1, wherein the controller is configured to obtain the intention analysis result information by itself, without transmitting the text data to the NLP server, based on existence of a foreground application operating at the device and which supports a speech recognition service.

* * * * *